United States Patent
Savage et al.

(10) Patent No.: US 12,402,635 B2
(45) Date of Patent: Sep. 2, 2025

(54) FOOD TENDERIZER SLEEVE AND METHOD OF USE

(71) Applicant: Amprod LLC, Strafford, MO (US)

(72) Inventors: Justin Savage, Greenwood, MO (US); Gregory Cissell, Liberty, MO (US); Devon Arnall, Willard, MO (US)

(73) Assignee: AMPROD LLC, Stafford, MO (US)

( * ) Notice: Subject to any disclaimer, the term of this patent is extended or adjusted under 35 U.S.C. 154(b) by 0 days.

(21) Appl. No.: 18/101,492

(22) Filed: Jan. 25, 2023

(65) Prior Publication Data

US 2023/0232844 A1 Jul. 27, 2023

Related U.S. Application Data

(60) Provisional application No. 63/302,705, filed on Jan. 25, 2022.

(51) Int. Cl.
*A22C 9/00* (2006.01)
(52) U.S. Cl.
CPC .................................. *A22C 9/008* (2013.01)
(58) Field of Classification Search
CPC ....................................................... A22C 9/008
USPC ................................................. 452/141–144
See application file for complete search history.

(56) References Cited

U.S. PATENT DOCUMENTS

| | | | | |
|---|---|---|---|---|
| 4,085,482 A | * | 4/1978 | Charron | A22C 9/004 452/144 |
| 4,199,841 A | * | 4/1980 | Jaccard | A47J 43/28 30/305 |
| 4,790,360 A | * | 12/1988 | Clarke | B27D 1/005 144/213 |
| 5,738,578 A | * | 4/1998 | Marchese | A22C 9/008 452/142 |
| 8,033,973 B1 | * | 10/2011 | Evans | B26D 7/06 452/143 |
| D720,190 S | * | 12/2014 | Iliev | D7/682 |

* cited by examiner

*Primary Examiner* — Richard T Price, Jr.
(74) *Attorney, Agent, or Firm* — Kutak Rock LLP (57) ABSTRACT

A food tenderizer sleeve and method of use is provided. The food tenderizer sleeve includes two end collars and segmented and split cutting blade sleeves, which are easy to remove, replace, and clean. In some embodiments, the segments of the cutting blade sleeves form generally a half-circle cross-sectional shape and mount a plurality of cutting blades and spacers between the cutting blades. In some embodiments, the segments include one end with male connection tabs and a second end with female tab receivers for connection to another segment or to an end collar. Each cutting blade sleeve segment is further configured for matching up with another sleeve segment to form a tube or sleeve shape configured to fit around a rotational drive shaft.

19 Claims, 6 Drawing Sheets

FOOD TENDERIZER SLEEVE AND METHOD OF USE

CROSS-REFERENCE TO RELATED APPLICATIONS

This application claims priority pursuant to 35 U.S.C. 119(e) to U.S. Provisional Patent Application Ser. No. 63/302,705, filed Jan. 25, 2022, the entire disclosure of which is incorporated herein by reference.

FIELD OF THE INVENTION

The present invention relates generally to food tenderizers. More specifically, the present invention is concerned with food tenderizers having split and segmented sleeves which mount numerous cutting blades and fit around and rotate with one or more drive shafts.

BACKGROUND

Tenderizers are commonly used in the foodservice industry and by people cooking at home to break down fibers and collagens in meats and other proteins to make them easier to chew and digest. There are several common ways of tenderizing food, including applying force to the food with a mallet having either a flat end or an end with a series of metal spikes; using a blade tenderizer having a series of cutting blades to cut a series of holes into the food; applying a tenderizing powder containing enzymes to break down fibers in the food; and putting the food through a rotating tenderizer having a series of cutting blades mounted around one or more rotational drive shafts for cutting a series of holes into the food. Nevertheless, these common methods of tenderizing food each have disadvantages.

Use of tenderizer mallets can be somewhat physically demanding as they are often rather heavy and require strength to lift and repeatedly swing the mallet onto the food to be tenderized. Additionally, a tenderizer mallet often does not work well to break down fibers and collagens unless the food is struck repeatedly with force from the mallet, so it can be time consuming or ineffective for its intended purpose. Moreover, use of a tenderizing mallet often results in unwanted splatter from the food to be tenderized around a user's kitchen workspace. Particularly for foods like raw chicken or other raw meats, splatter from using a tenderizing mallet can result in contamination requiring additional cleaning and/or sanitizing of the user's kitchen. Accordingly, it would be beneficial to have a food tenderizer which is quick and easy to use and which helps to lessen unnecessary food splatter.

Similarly, blade tenderizers can be physically strenuous for some to use because they typically require force to be applied to engage the device, pushing the series of cutting blades into the food to be tenderized. Depending on the size of the blade tenderizer and the size and type of food to be tenderized, multiple uses of a blade tenderizer device may be required to effectively tenderize the food. When the shape of the food to be tenderized does not match up with the shape of the blade tenderizer device, it can lead to overlapped area(s) around a center section of the food which become overcut and/or area(s) along the outside of the food which are not tenderized. Accordingly, it would be beneficial to have a food tenderizer which is easy to use and provides uniform breakdown of fibers and collagens in the food to be tenderized.

Powder tenderizers typically include either papain, an enzyme which comes from papayas, or bromelain, an enzyme which comes from pineapples. These enzymes work to break down fibers and soften collagen over time in food to which the tenderizer is applied. Nevertheless, these powder tenderizers require a waiting period to allow the enzymes to properly work to break down fibers and soften collagen in food. A cook may not have time to set the food to be tenderized aside for a period of time to allow a powder tenderizer to work. Furthermore, the enzymes in powder tenderizers continue to break down fibers and soften collagen into gelatin until the cooking process begins, so if a powder tenderizer is applied to a food for too long prior to cooking, the enzymes will continue to work until the food turns to mush. Thus, a tenderizer utilizing enzymes must be applied for a minimum amount of time to be effective but for less than an amount of time that becomes counterproductive from over breakdown of fibers and softening of collagen. Additionally, many powder tenderizers include undesirable food additives which some people wish to avoid consuming. For a natural alternative, fresh *papaya* or pineapple can be added to food to be tenderized, however in addition to the aforementioned timing disadvantages of using enzymes for tenderization, this adds citrus flavor to the food to be tenderized, which may be unwelcome. Accordingly, it would be beneficial to have a quick and convenient food tenderizer which does not include unwanted food additives or add flavor to the food to be tenderized.

Rotary food tenderizers provide for quick, easy, and uniform tenderization of food by placing the food through rotating drive shafts mounting a series of cutting blades for cutting into the food to break down fibers and collagens. Notwithstanding the ease and efficiency of using a rotary food tenderizer, problems arise when one or more cutting blades break or become contaminated and need cleaning. When such repair, replacement, or cleaning is required, it is typically burdensome to take apart the device, requiring a user to remove individual blades and spacers one by one. Thus, required repair or cleaning can cause a rotary food tenderizer to be out of service for an extended period of time. Accordingly, it would be beneficial to have a food tenderizer device with the ease and uniformity of a rotary tenderizer but which also has parts which are easy to replace and clean.

Some power tools incorporate blades which are easy to replace and/or clean. For instance, some circular saw blades are split, such as in U.S. Pat. No. 4,570,517, allowing for easier handling, cleaning, and replacement of cutting blades a half blade at a time. Nevertheless, multiple blade cutting systems with segments which are easy to remove, handle, and clean are not readily available, particularly for food tenderization. Accordingly, it would be beneficial to have a food tenderizer with cutting blade segments which are easy to remove, replace, and clean.

Heretofore, there has not been a food tenderizer device and method with the advantages and features of the present invention.

SUMMARY

The present invention comprises a food tenderizer cutting blade sleeve system and methods of use thereof. In an exemplary embodiment, cutting blade sleeves of the present invention are segmented and split, with each segment forming generally a half-circle cross-sectional shape. Each segment mounts a plurality of cutting blades and spacers between the cutting blades and includes one end with male connection tabs and a second end with female tab receivers for connection to another segment or to an end collar. Each cutting blade sleeve segment is further configured for matching up with another sleeve segment to form a tube or sleeve shape configured to fit around a rotational drive shaft.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
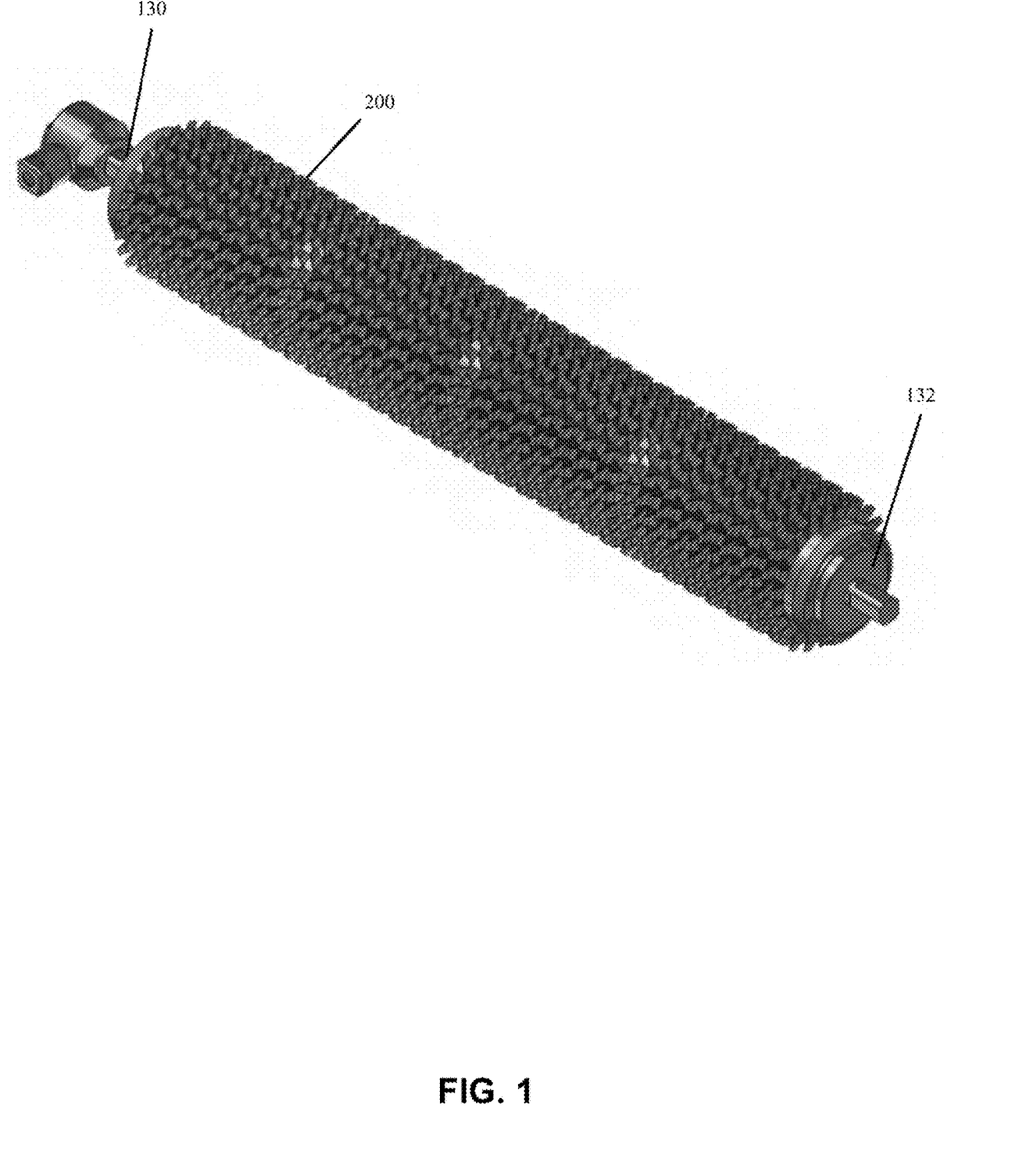
FIG. 1 is an upper, end, perspective view of a cutting blade sleeve system embodying the present invention in an assembled configuration around an elongated drive shaft.

Referring to FIG. 1, a cutting blade sleeve system 100 of the present invention is shown that includes a first end collar 120 and second end collar 122, each of which forms a substantially circular shape. In some embodiments, one end collar 120 includes male connection tabs 140 for connection to female tab receivers 142 of two cutting blade sleeve segments 210 and configured for holding the two sleeve segments 210 in a sleeve section 200 around a drive shaft 150 in an assembled configuration. In some embodiments, the other end collar 122 has female tab receivers 142 for connection to male connection tabs 140 of two cutting blade sleeve segments 210 and configured for holding the sleeve segments 210 in a sleeve section 200 around the drive shaft 150 in an assembled configuration.

Figure 2:
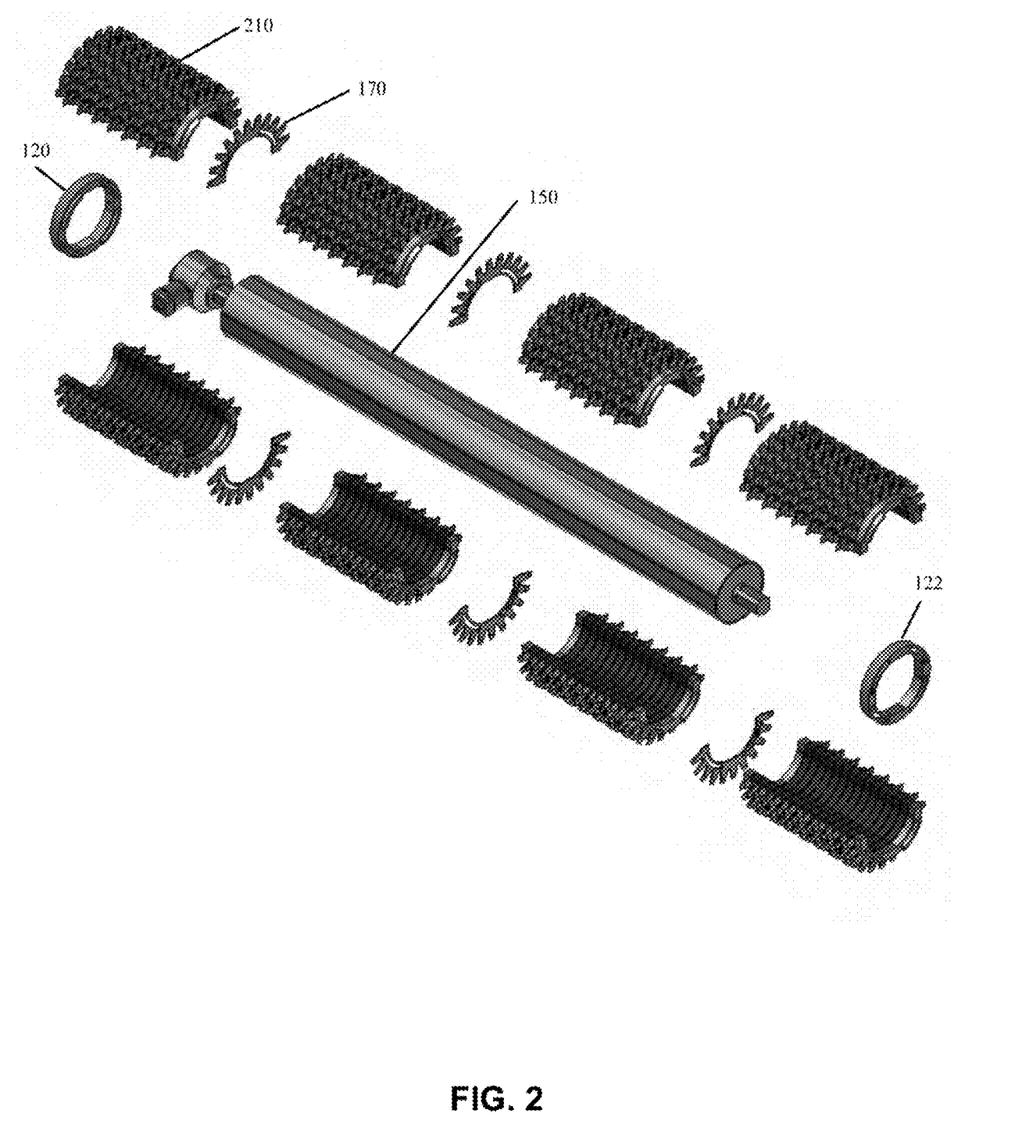
FIG. 2 is an upper, end, exploded, perspective view of the cutting blade sleeve system in a disassembled configuration, showing separated cutting blade sleeve segments, two end collars, connector cutting blade pieces, and an associated rotational drive shaft.
Figure 3:
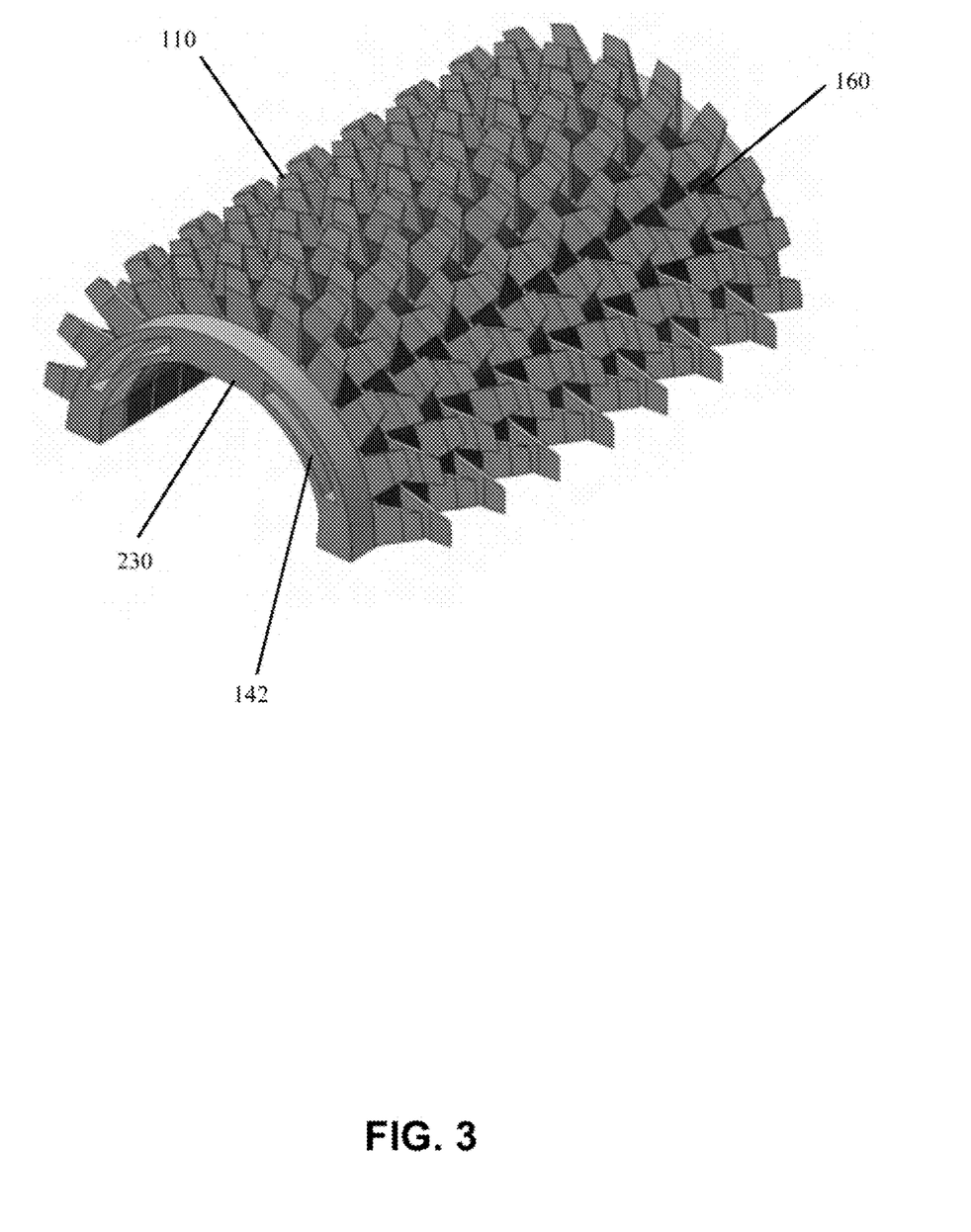
FIG. 3 is an upper, end, perspective view of a cutting blade sleeve segment of the cutting blade sleeve system, showing an end of the sleeve segment having two female tab receivers configured for connection to male connection tabs of an adjoining cutting blade sleeve segment or end collar.
Figure 4:
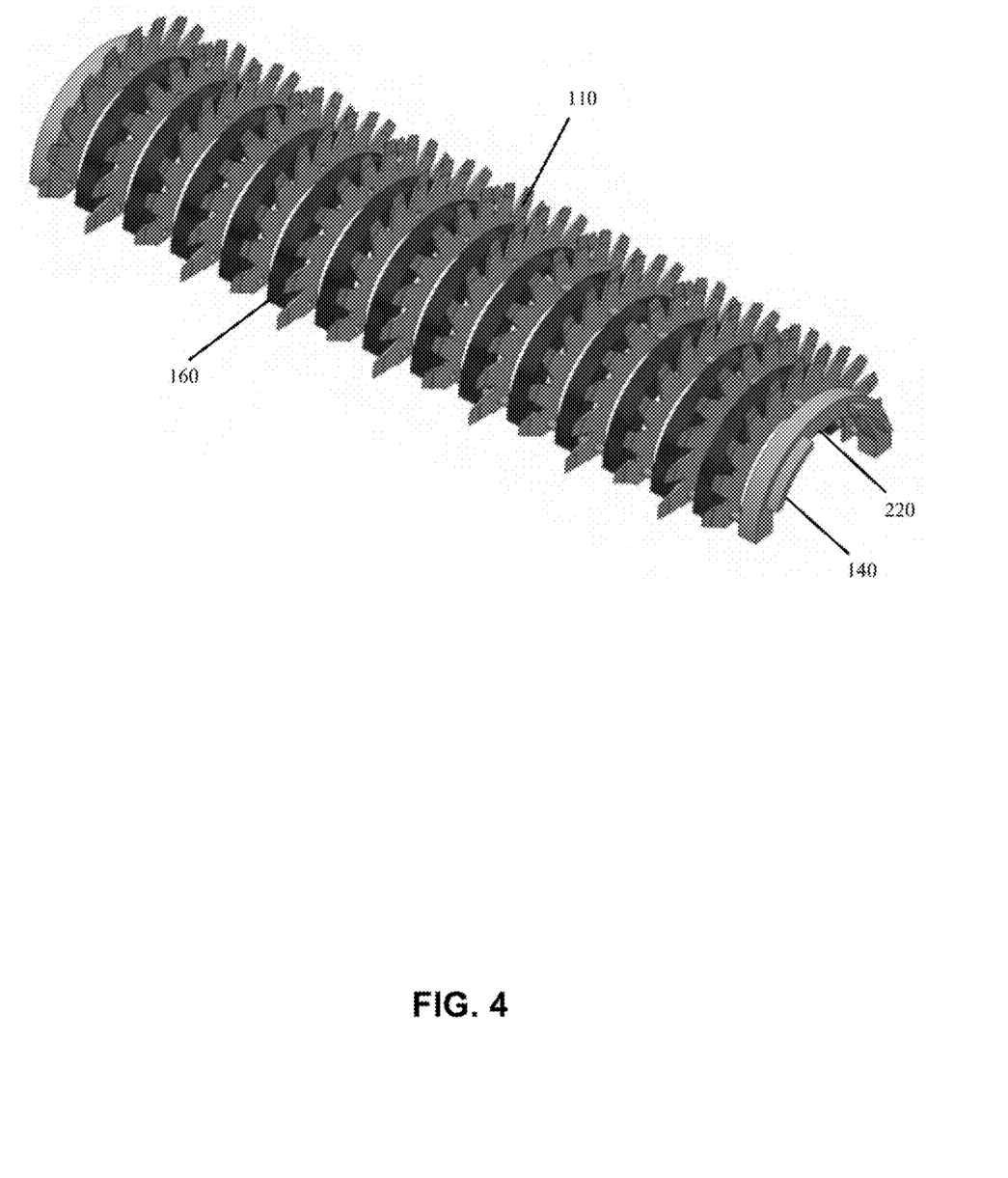
FIG. 4 is an upper, side, perspective view of a cutting blade sleeve segment of the present invention, showing an end of the sleeve segment having two male connection tabs configured for connection to female tab receivers of an adjoining cutting blade sleeve segment or end collar.

Each sleeve section 200 is therefore made of two or more sleeve segments 210 and has a first end 220 and second end 230. In some embodiments, multiple sleeve segments 210 are connected via male tab 140 and female tab receiver 142 connections, paired with another set of sleeve segments 210, and connected and held together by end collars 120 and 122, forming an elongated sleeve shape mounting a plurality of interconnected sleeve sections 200 around a rotary drive shaft 150.

In an exemplary embodiment, the cutting blade sleeve system 100 further includes connector cutting blade pieces 170 connected between sleeve segments 210, attached to segment male connection tabs 220, to prevent cutting blade gaps between sleeve segments 210. Nevertheless, in alternative embodiments, the connection between sleeve segments 210 is sized to be the same size or approximately the same size as a cutting blade sleeve spacer 160, and no connector cutting blade pieces 170 are required.

In a preferred embodiment of the present invention, the cutting blades 110 mounted on the sleeve segments 210 are toothed cutting blades having a series of alternating sharpened extensions, or "teeth," and recessed portions between the sharpened extensions. The sharpened extensions and recessed portions are uniformly spaced apart, the blades being arched in a semicircular shape. Each sleeve mounts a series of cutting blades 110 in parallel, separated by spacers 160, with each cutting blade positioned in a direction perpendicular to the longitudinal direction of the sleeve and drive shaft 150. In an exemplary embodiment, the cutting blades 110 are assembled onto each sleeve segment 210 in an alternating, staggered pattern such that the teeth of one blade match up with recessed portions of the next closest blades in a longitudinal direction and vice versa.

Such an arrangement of rows of toothed cutting blades 110 of the present invention, when used in association with one or more rotational drive shafts 150, is configured for producing a plurality of spaced-out, uniform cuts into a food to be tenderized. In embodiments having cutting blades mounted in an alternating pattern, such blade pattern allows for staggered blade teeth rather than blade teeth forming a straight line down the longitudinal axis of the shaft when rotated. This accommodates more effective contact with the food for tenderization. In a preferred embodiment, two cutting blade sleeves 200 are utilized with two rotational drive shafts 150 of a rotary food tenderizer, the rotational drive shafts 150 configured to rotate in opposite directions. In such an embodiment, the rotary food tenderizer is configured so that food to be tenderized is fed between the two rotating cutting blade sleeves 200 causing the cutting blade sharpened extensions to cut into the food to breakdown fibers and collagens. In alternative embodiments, the number of drive shafts 150 and directions of rotation are varied. The present invention is capable of being utilized with any type of rotary food tenderizer having one or more drive shafts 150, including but not limited to manual, hand-turned rotary food tenderizers and electric motor-powered rotary food tenderizers.

The segmented and split cutting blade sleeves 200 of the present invention allow for quick and easy replacement and cleaning of rotational food tenderizer cutting blades 110. Rather than having to disassemble a rotational cutting blade sleeve 200 by removing individual cutting blades 110 and spacers 160 one by one, the cutting blade sleeves 200 of the present invention are capable of being quickly disassembled by removing the retaining end collars 120 and 122 and separating the sleeve segments 210. If one or more cutting blades 110 in a particular segment 210 need to be cleaned or replaced, that sleeve segment 210 is capable of being cleaned or replaced with a new sleeve segment 210, and the cutting blade sleeve 200 is capable of then being quickly reassembled. Accordingly, the present invention provides the ease and uniformity of a rotary food tenderizer with components that are easy to clean and replace.

The cutting blade sleeves 200 of the present invention are scalable. The number of cutting blades 110 and spacers 160 mounted on each segment 210 varies in different embodiments. Additionally, the number of segments 210 used in forming one cutting blade sleeve 200 also varies in different embodiments. In an exemplary embodiment, the cutting blades are made of stainless steel. In other embodiments, the cutting blades of the present invention are made up of any other type of metal or hard material capable of being sterilized for food preparation and of cutting through a food to be tenderized. In an exemplary embodiment, the cutting blade sleeves 200 are formed by two sleeve segments 210. In other embodiments, the cutting blade sleeves 200 are formed by three or more sleeve segments 210.

Figure 5:
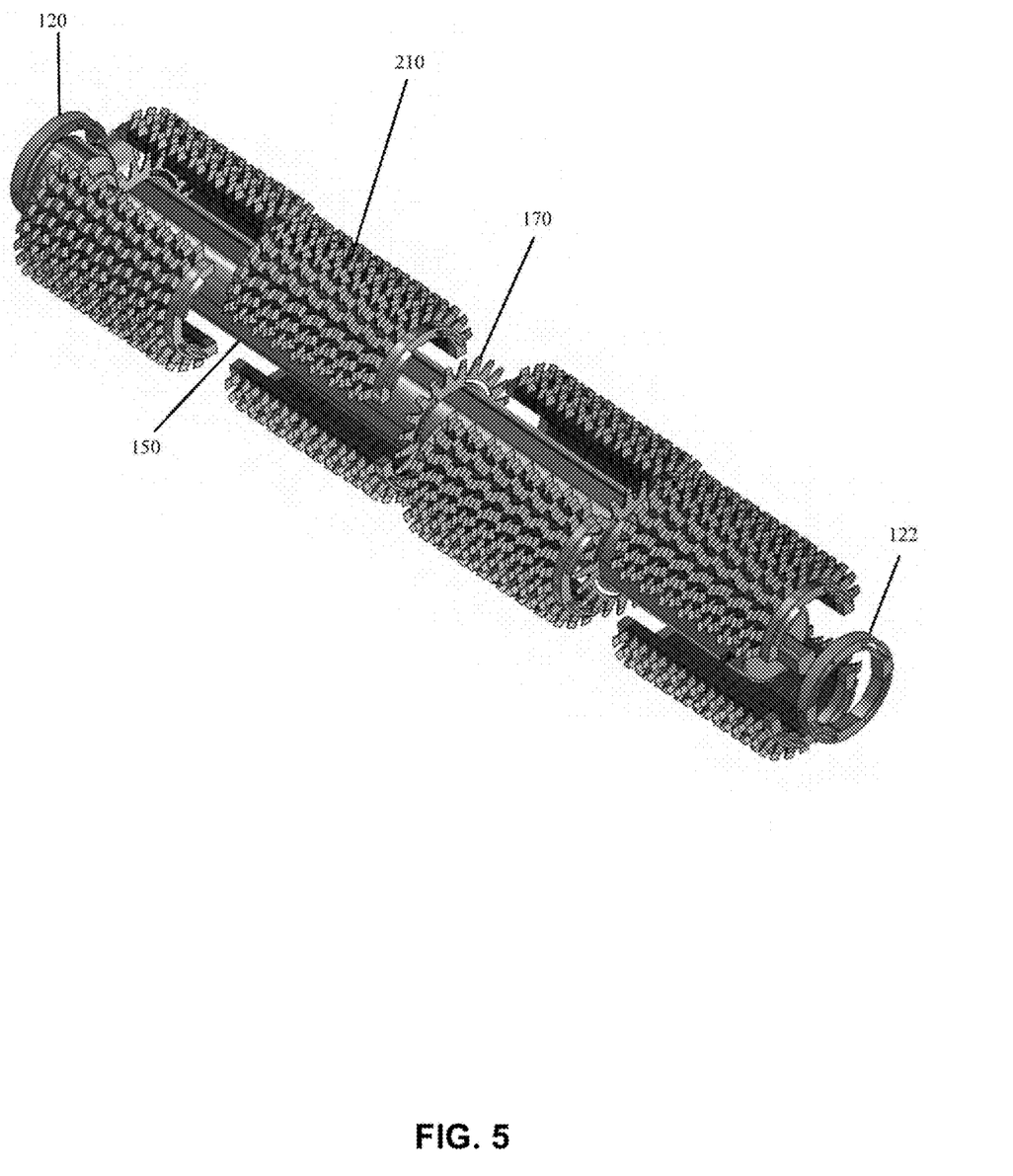
FIG. 5 is an upper, end, exploded, perspective view of an exemplary embodiment of a cutting blade sleeve system of the present invention, illustrating 90-degree rotationally staggered cutting blade sleeve segment pair positioning of the cutting blade sleeve around an associated drive shaft.

In an exemplary embodiment of the present invention, during assembly of a cutting blade sleeve 200, the split lines between paired cutting blade sleeve segments 210 are rotationally staggered between lateral pairs of sleeve segments 210. Such rotational staggering of the sleeve segment pairs 210 helps prevent separation of the cutting blade sleeve segments 210 during operation of the food tenderizer and creates a firmer lock of the sleeve segments 210 around the drive shaft 150. In alternative embodiments, the cutting blade sleeve segment 210 split lines between segment pairs are aligned across lateral pairs of sleeve segments 210 of the cutting blade sleeve 200.

Figure 6:
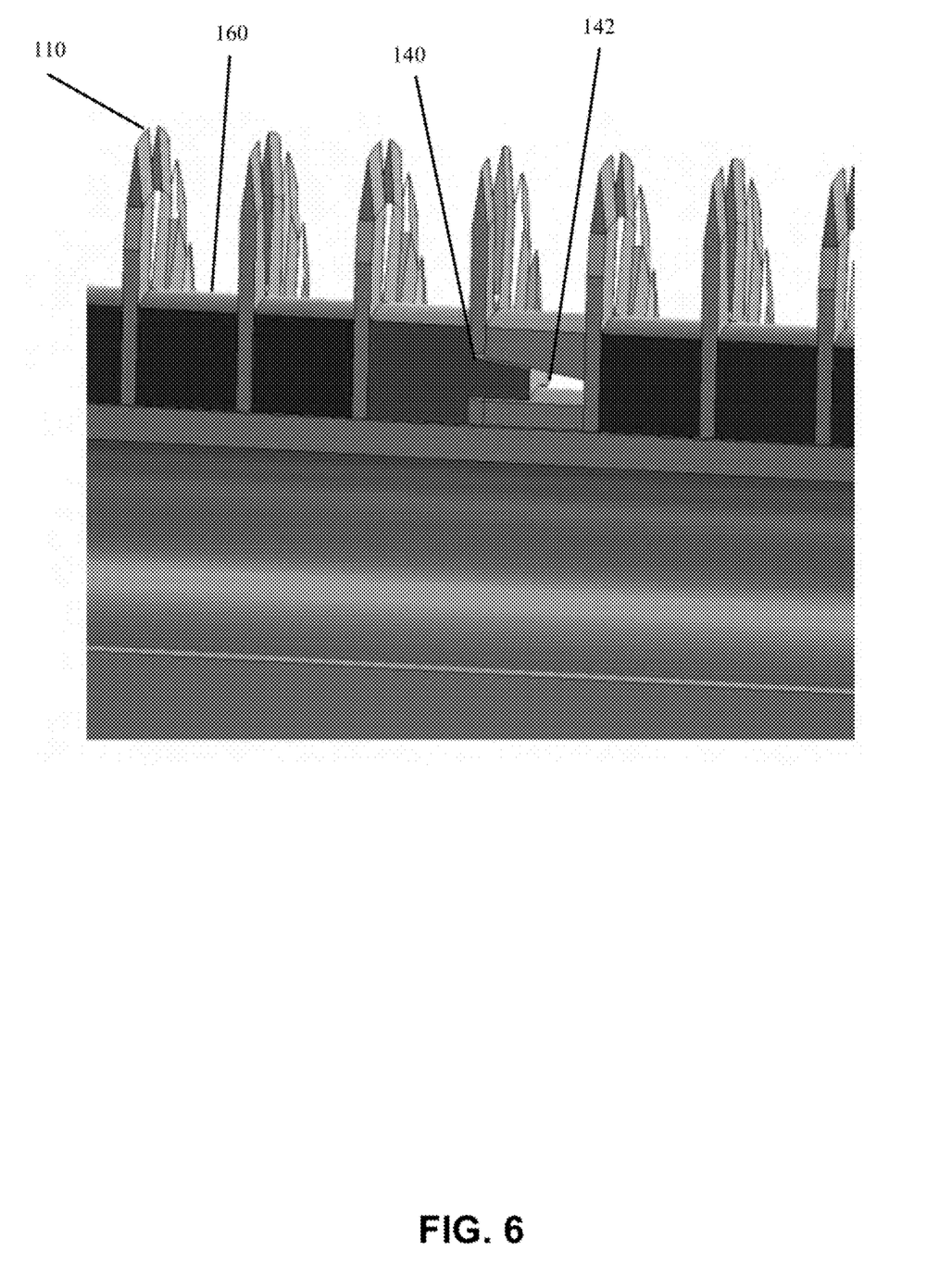
FIG. 6 is an enlarged, side, cross-sectional view of a cutting blade sleeve segment connection to another cutting blade sleeve segment of an embodiment of the present invention having tapered male connection tab and female tab receiver connections.

In an embodiment of the present invention, the cutting blade sleeve system male connection tabs 140 and female tab receivers 142 are tapered in a manner to compress the cutting blade sleeve segments 210 to another sleeve segment 210 or end collar 120 and 122, providing a resultant force directed toward the center of the drive shaft 150. Such tapered tab connections help to retain the cutting blade sleeve segments 210 in an assembled configuration around the drive shaft 150.

In further embodiments, cutting blade sleeve systems of the present invention are utilized for other uses than for food tenderization, such as for leatherworking, metalworking, or any other method where making a series of uniform cuts into an object is desired. In some embodiments, the cutting blades 110 mounted on the sleeve segments 210 are not toothed but rather each have a semicircular sharpened edge.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

Certain terminology is used in the description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. Said terminology shall include the words specifically mentioned, derivatives thereof, and words of similar meaning "Substantially" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder. "Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is:

1. A food tenderizer sleeve assembly comprising:
   first and second sleeve segments, each sleeve segment including substantially a half-circle cross-sectional shape;
   wherein said first and second sleeve segments are equal in longitudinal length and configured for matching up together to form a first paired sleeve section including substantially a tube shape with first and second ends;
each sleeve segment mounting a plurality of cutting blades protruding outward from said sleeve segment;
first and second end collars, each end collar including substantially a circular shape, wherein said first end collar attaches to a first end of said food tenderizer sleeve assembly and said second end collar attaches to a second end of said food tenderizer sleeve assembly in an assembled configuration; and
wherein said first and second end collars are configured to retain said food tenderizer sleeve assembly in said assembled configuration.

2. The food tenderizer sleeve assembly according to claim 1, wherein:
said food tenderizer sleeve assembly is configured to closely fit around a rotational drive shaft in said assembled configuration such that said food tenderizer sleeve assembly is configured to rotate about a rotational axis along with rotation of said drive shaft.

3. The food tenderizer sleeve assembly according to claim 2, wherein:
each of said cutting blades is mounted in a direction substantially perpendicular to said rotational axis.

4. The food tenderizer sleeve assembly according to claim 1, wherein:
each sleeve segment further comprises spacers mounted between said plurality of cutting blades.

5. The food tenderizer sleeve assembly according to claim 1, wherein:
each cutting blade comprises alternating sharpened extensions and recessed portions spaced uniformly apart and arched in a substantially semicircular shape.

6. The food tenderizer sleeve assembly according to claim 1, further comprising:
third and fourth sleeve segments equal in longitudinal length and configured for matching up together to form a second paired sleeve section including substantially a tube shape with first and second ends; and
wherein said first paired sleeve section second end is configured for connection to said second paired sleeve section first end.

7. The food tenderizer sleeve assembly according to claim 6, wherein:
said first paired sleeve section is rotationally staggered from said second paired sleeve section in said assembled configuration such that seams between paired sleeve segments are rotated 90-degrees between said first and second paired sleeve sections for added stability of said food tenderizer sleeve assembly in said assembled configuration.

8. The food tenderizer sleeve assembly according to claim 6, wherein:
said first paired sleeve first end and said second paired sleeve first end each comprise male connection tabs;
said first paired sleeve second end and said second paired sleeve second end each comprise female tab receivers;
said first end collar comprises female tab receivers;
said second end collar comprises male connection tabs;
said connection between said first paired sleeve section second end and said second paired sleeve section first end comprises connection between said first paired sleeve section second end female tab receivers and said second paired sleeve section first end male connection tabs;
said first end collar attachment to said first end of said food tenderizer sleeve assembly comprises a connection between said first end collar female tab receivers and said first paired sleeve section first end male connector tabs; and
said second end collar attachment to said second end of said food tenderizer sleeve assembly comprises a connection between said second end collar male connector tabs and said second paired sleeve section second end female tab receivers.

9. The food tenderizer sleeve assembly according to claim 8, wherein:
said male connection tabs and female tab receivers are tapered in a manner to compress the first and second paired sleeve segments to each other or said first or second end collar.

10. The food tenderizer sleeve assembly according to claim 6, further comprising:
connector cutting blade pieces configured for placement between said first and second paired sleeve segments.

11. The food tenderizer sleeve assembly according to claim 6, further comprising:
fifth and sixth sleeve segments equal in longitudinal length and configured for matching up together to form a third paired sleeve section including substantially a tube shape with first and second ends; and
wherein said second paired sleeve section second end is configured for connection to said third paired sleeve section first end.

12. The food tenderizer sleeve assembly according to claim 11, wherein:
said second paired sleeve section is rotationally staggered from said third paired sleeve section in said assembled configuration such that seams between paired sleeve segments are rotated 90-degrees between said second and third paired sleeve sections for added stability of said food tenderizer sleeve assembly in said assembled configuration.

13. The food tenderizer sleeve assembly according to claim 11, wherein:
said first paired sleeve first end, said second paired sleeve first end, and said third paired sleeve first end each comprise male connection tabs;
said first paired sleeve second end, said second paired sleeve second end, and said third paired sleeve third end each comprise female tab receivers;
said first end collar comprises female tab receivers;
said second end collar comprises male connection tabs;
said connection between said first paired sleeve section second end and said second paired sleeve section first end comprises connection between said first paired sleeve section second end female tab receivers and said second paired sleeve section first end male connection tabs;
said connection between said second paired sleeve section second end and said third paired sleeve section first end comprises connection between said second paired sleeve section second end female tab receivers and said third paired sleeve section first end male connection tabs;
said first end collar attachment to said first end of said food tenderizer sleeve assembly comprises a connection between said first end collar female tab receivers and said first paired sleeve section first end male connector tabs; and
said second end collar attachment to said second end of said food tenderizer sleeve assembly comprises a connection between said second end collar male connector tabs and said third paired sleeve section second end female tab receivers.

14. A method of using a food tenderizer sleeve assembly comprising the steps of:
providing first, second, third, and fourth sleeve segments, each sleeve segment including a substantially half-circle cross-sectional shape and mounting a plurality of cutting blades outward from said sleeve segment;
aligning said first sleeve segment with said second sleeve segment forming a first paired sleeve section having substantially a tube shape with first and second ends;
aligning said third sleeve segment with said fourth sleeve segment forming a second paired sleeve section having substantially a tube shape with first and second ends;
attaching said first paired sleeve section to said second paired sleeve section;
attaching a first end collar to a first end of said food tenderizer sleeve assembly;
attaching a second end collar to a second end of said food tenderizer sleeve assembly; and
said first and second end collars retaining said food tenderizer sleeve assembly in an assembled configuration.

15. The method of claim 14, wherein:
said aligning said first sleeve segment with said second sleeve segment comprises placing said first and second sleeve segments around a rotational drive shaft;
said aligning said third sleeve segment with said fourth sleeve segment comprises placing said third and fourth sleeve segments around said rotational drive shaft; and
said attaching said first end collar to said first end of said food tenderizer sleeve assembly and said attaching said second end collar to said second end of said food tenderizer sleeve assembly further comprises attaching said food tenderizer sleeve assembly around said rotational drive shaft with said first and second end collars.

16. The method of claim 14, further comprising the steps of:
providing fifth and sixth sleeve segments, each sleeve segment having a substantially half-circle cross-sectional shape and mounting a plurality of cutting blades outward from said sleeve segment;
aligning said fifth sleeve segment with said sixth sleeve segment forming a third paired sleeve section having substantially a tube shape with first and second ends; and
attaching said third paired sleeve section to said second paired sleeve section.

17. The method of claim 16, further comprising the step of:
rotationally staggering said first, second, and third paired sleeve sections such that seams between paired segments are alternated by 90-degree rotation.

18. The method of claim 14, further comprising the step of:
placing connector cutting blade pieces between said first and second paired sleeve segments.

19. A method of repairing a food tenderizer sleeve assembly comprising the steps of:
removing first and second end collars from first and second ends of a food tenderizer sleeve assembly;
separating sleeve segments from each other and from around a rotational drive shaft;
removing a sleeve segment having one or more broken cutting blades;
replacing said sleeve segment with one or more broken cutting blades with a replacement sleeve segment;
re-aligning said sleeve segments around said rotational drive shaft; and
re-attaching said first and second end collars to said first and second ends of said food tenderizer sleeve assembly.

* * * * *